United States Patent
Walton et al.

(10) Patent No.: US 6,371,156 B1
(45) Date of Patent: Apr. 16, 2002

(54) NO-BLEED PILOT FOR PRESSURE REGULATING VALVE

(75) Inventors: Herbert H. Walton, Marshalltown; Douglas C. Pfantz, Melbourne; Gary L. Scott; Wayne W. Sloppy, both of Marshalltown, all of IA (US)

(73) Assignee: Fisher Controls International, Inc., Clayton, MO (US)

( * ) Notice: Subject to any disclaimer, the term of this patent is extended or adjusted under 35 U.S.C. 154(b) by 0 days.

(21) Appl. No.: 09/636,193

(22) Filed: Aug. 10, 2000

(51) Int. Cl.7 .............................................. G05D 16/16
(52) U.S. Cl. ....................... 137/488; 137/106
(58) Field of Search ................... 137/488, 106

(56) References Cited

U.S. PATENT DOCUMENTS

| | | | |
|---|---|---|---|
| 1,000,729 A | | 8/1911 | Gloecker |
| 1,021,762 A | * | 4/1912 | Cross ......................... 137/488 |
| 1,987,505 A | * | 1/1935 | Edler ...................... 137/488 X |
| 2,037,179 A | | 4/1936 | Robart et al. |
| 2,309,848 A | | 2/1943 | King |
| 2,523,826 A | | 9/1950 | Heinzelman |
| 3,205,909 A | * | 9/1965 | Oldfield .................. 137/488 X |
| 3,238,966 A | * | 3/1966 | Howard et al. ............. 137/488 |
| 3,447,566 A | | 6/1969 | Hayner et al. ............ 137/489.5 |
| 3,493,007 A | | 2/1970 | Ilzumi ..................... 137/116.5 |
| 3,495,619 A | | 2/1970 | Ilzumi ..................... 137/489.5 |
| 3,625,246 A | * | 12/1971 | Reaves ................... 137/488 X |
| 4,197,877 A | | 4/1980 | Winiasz ................... 137/625.3 |
| 4,250,913 A | | 2/1981 | Scull .......................... 137/488 |
| 4,609,008 A | | 9/1986 | Anderson, Jr. et al. ..... 137/488 |
| 4,611,621 A | * | 9/1986 | Miyakawa et al. ..... 137/488 X |
| 4,917,144 A | | 4/1990 | Giles ......................... 137/488 |
| 5,027,852 A | | 7/1991 | McNeely .................... 137/488 |
| 5,620,017 A | | 4/1997 | Yamada ..................... 137/312 |
| 5,735,308 A | | 4/1998 | Yokota et al. ............. 137/488 |
| 5,738,333 A | | 4/1998 | Cognevich et al. ........ 251/61.2 |

* cited by examiner

*Primary Examiner*—Gerald A. Michalsky
(74) *Attorney, Agent, or Firm*—Marshall, Gerstein & Borun (57) ABSTRACT

A control valve assembly including a no-bleed pilot valve is disclosed. The pilot valve includes a pressure responsive valve adapted to move in connection with a control parameter, such as downstream fluid pressure. The pressure responsive valve selectively connects certain ports with upper and lower chambers of a control valve actuator so that the upstream and downstream fluid pressures may be used to operate the actuator.

23 Claims, 4 Drawing Sheets

NO-BLEED PILOT FOR PRESSURE REGULATING VALVE

FIELD OF THE INVENTION

The present invention generally relates to pressure regulating devices, and more particularly to pilots for controlling such devices.

BACKGROUND OF THE INVENTION

The use of pilots to control pressure regulating valves is well known in the art. A pressure regulating valve typically includes a valve body having an upstream inlet and a downstream outlet. A throttling member such as a plug is disposed between the inlet and the outlet and engages a seat formed in the valve body. A stem attached to the plug engages an actuator, which moves the stem and attached plug between open and closed positions.

The pilot is used to control the actuator according to a control parameter, such as downstream fluid pressure. The pilot typically includes a pilot valve body having an inlet, an outlet, and a valve seat disposed between the inlet and outlet. A pilot throttling member is positioned to engage the pilot seat, and a pilot stem is attached to the pilot throttling member. The pilot stem typically engages a flexible diaphragm which is biased towards an open position in which fluid flow is allowed through the pilot. The outlet of the pilot is connected to the downstream fluid piping so that the downstream pressure registers at the pilot. The inlet of the pilot is attached to upstream fluid piping through a restricter. Between the pilot inlet and the restricter, a control pressure branch extends to the pressure control valve to provide a control pressure for the actuator.

In operation, when the downstream fluid pressure exceeds a desired set point, the pilot throttling member moves toward a closed position, thereby directing inlet pressure toward the control valve actuator. In response, the actuator pushes the plug toward the closed position to reduce fluid flow through the valve, thereby reducing downstream pressure. When downstream pressure drops below the desired set point, the pilot throttling member moves toward the open position to reduce the inlet pressure directed toward the actuator. In response, the actuator moves the plug to an open position to increase flow through the valve, thereby increasing downstream pressure. The pilot throttling member is at least partially open most of the time. As a result, process fluid bleeds through the pilot and is discharged either to atmosphere or to the downstream fluid piping. Bleeding to atmosphere results in lost product, while bleeding to the downstream fluid piping introduces an uncontrolled volume of fluid downstream of the valve.

Certain devices have been proposed which reduce the bleeding through the pilot. Becker Precision Equipment, Inc., for example, has proposed a valve regulator pilot for use with a double-acting cylinder actuator for use in pressure control applications. The actuator includes a chamber having a piston which is mechanically linked to a valve actuating arm. The piston divides the chamber into upper and lower chamber sections, each section having a pressure port. The pilot includes a pair of pistons, each piston controlling pressure flow into an associated one of the upper and lower chamber sections. The pilot pistons move according to the differential between pilot supply pressure and discharge pressure and, accordingly, vary the pressures supplied to the upper and lower chambers sections. The relative pressures in the upper and lower chamber sections drive the piston to adjust the valve. The use of two pilot pistons, as well as separate restricters located upstream of the pilot, however, significantly increases the response time of the pilot.

In view of the foregoing, a pilot for use with a pressure regulating device is desired which minimizes bleeding and reduces response time.

SUMMARY OF THE INVENTION

In accordance with certain aspects of the present invention, a control valve assembly is provided for a main line transporting a fluid. The control valve assembly comprises a control valve and an actuator adapted to actuate the control valve. The actuator includes a dome and a pressure surface disposed inside the dome to define first and second chambers of the dome, the pressure surface moving in response to a pressure differential between the first and second chambers. A pilot valve is provided having a first connection port, a second connection port, a first control port, a second control port, and a pressure responsive valve member. A first passageway communicates the fluid at a first pressure from the main flow line to the first connection port. A second passageway communicates the fluid at a second pressure from the main flow line to the second connection port, the second pressure being different than the first pressure. A third passageway extends between the first control port and the first chamber of the actuator. A fourth passageway extends between the second control port and the second chamber of the actuator. The pressure responsive valve is adapted to move in response to the second pressure between a first position, in which the first passageway fluidly communicates with the third passageway and the second passageway fluidly communicates with the fourth passageway, and a second position, in which the first passageway fluidly communicates with the fourth passageway, and the second passageway fluidly communicates with the third passageway.

In accordance with additional aspects of the present invention, a control valve assembly is provided for use in a main flow line transporting fluid. The control valve assembly comprises a control valve adapted to be disposed in the main flow line and an actuator having a dome. A pressure surface is disposed inside the dome for actuating the control valve between open and closed positions, the pressure surface dividing the dome into first and second chambers. A pilot valve is provided having an inlet in fluid communication with an upstream portion of the main flow line, an outlet in fluid communication with a downstream portion of the main flow line, a first control pressure port in fluid communication with the actuator first chamber, a second control pressure port in fluid communication with the actuator second chamber, and a pressure responsive valve in fluid communication with the pilot valve outlet. The pressure responsive valve is movable between a first position, in which the inlet fluidly communicates with the first control pressure port and the outlet fluidly communicates with the second pressure control port, and a second position, in which the inlet fluidly communicates with the second pressure control port, and the outlet fluidly communicates with the first pressure control port.

In accordance with further aspects of the present invention, a pilot valve is provided for a control valve disposed in a main flow line. The pilot valve comprises an inlet fluid chamber in fluid communication with fluid to be controlled in the main flow line on one side of the control valve, and an outlet fluid chamber in fluid communication with the main flow line on an opposite side of the control valve. A first control fluid chamber is in fluid communication with one side of a pressure surface in the control valve, and a second control fluid chamber fluidly communicates with an opposite side of a pressure surface in the control valve. A diaphragm is disposed inside the outlet fluid chamber and movable in response to an outlet fluid pressure between a lockup position and a flow position. A passage is formed in the pilot valve to establish fluid communication between the inlet fluid chamber and the first control fluid chamber. An insert defining a valve seat is positioned between the inlet fluid chamber and the second control fluid chamber, while a slidable valve body is supported for movement with the diaphragm. The valve body has a central passage with a lower end in fluid communication with the first control fluid chamber and an enlarged valve portion. The passage is unobstructed and the enlarged valve portion engages the insert valve seat when the diaphragm is in the lockup position, and the enlarged valve portion is spaced from the insert valve seat and the passage is blocked when the diaphragm is in the flow position. A stationary collar defines an orifice establishing fluid communication between the outlet fluid chamber and the second control fluid chamber. A stationary stop member defines a valve seat positioned between the outlet fluid chamber and an upper end of the central passage. A movable collar is supported for movement with the diaphragm and defines an orifice. The movable collar engages the stationary stop member valve seat to cut off flow through the movable collar orifice when the diaphragm is in the lockup position, and the movable collar engages the stationary collar to cut off flow through the stationary collar orifice when the diaphragm is in the flow position.

DETAILED DESCRIPTION OF THE PREFERRED EMBODIMENT

Figure 1:
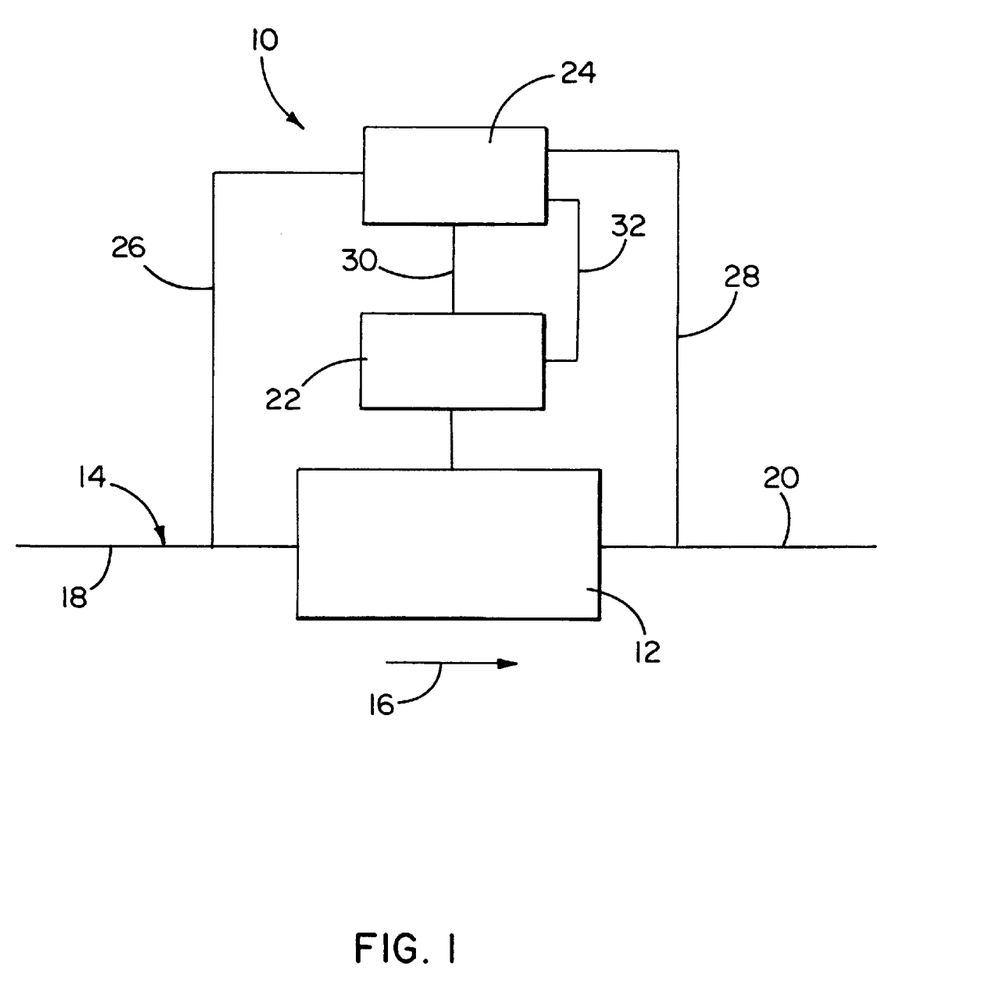
FIG. 1 is a block diagram of a control valve assembly in accordance with the teachings of the present invention.

A control valve assembly 10 is schematically illustrated in FIG. 1. The control valve assembly 10 includes a control valve 12 installed in a main flow line 14 used to transport a process fluid. The process fluid travels in the direction indicated by arrow 16, from left to right as shown in FIG. 1. The control valve 12, therefore, divides the main flow line 14 into an upstream pipe section 18 and a downstream pipe section 20. An actuator 22 is provided for actuating the control valve 12 between open and closed positions.

A pilot valve 24 is provided for controlling the actuator according to a measured parameter. As illustrated in FIG. 1, the pilot valve 24 is connected by a first passageway 26 to the upstream pipe section 18 and a second passageway 28 to the downstream pipe section 20. A third passageway 30 and a fourth passageway 32 connect the pilot valve 24 to the actuator 22, thereby to supply and exhaust control pressure, as described in greater detail below. A pressure responsive valve 34 (FIGS. 2–4) selectively controls fluid communication between the passageways to adjust the actuator according to the measured parameter. In the current embodiment, the pressure responsive valve 34 is adapted to move in response to downstream fluid pressure communicated by the second passageway 28. It will be appreciated, however, that other parameters, such as upstream fluid pressure, may be used as the measured parameter.

Figure 2:
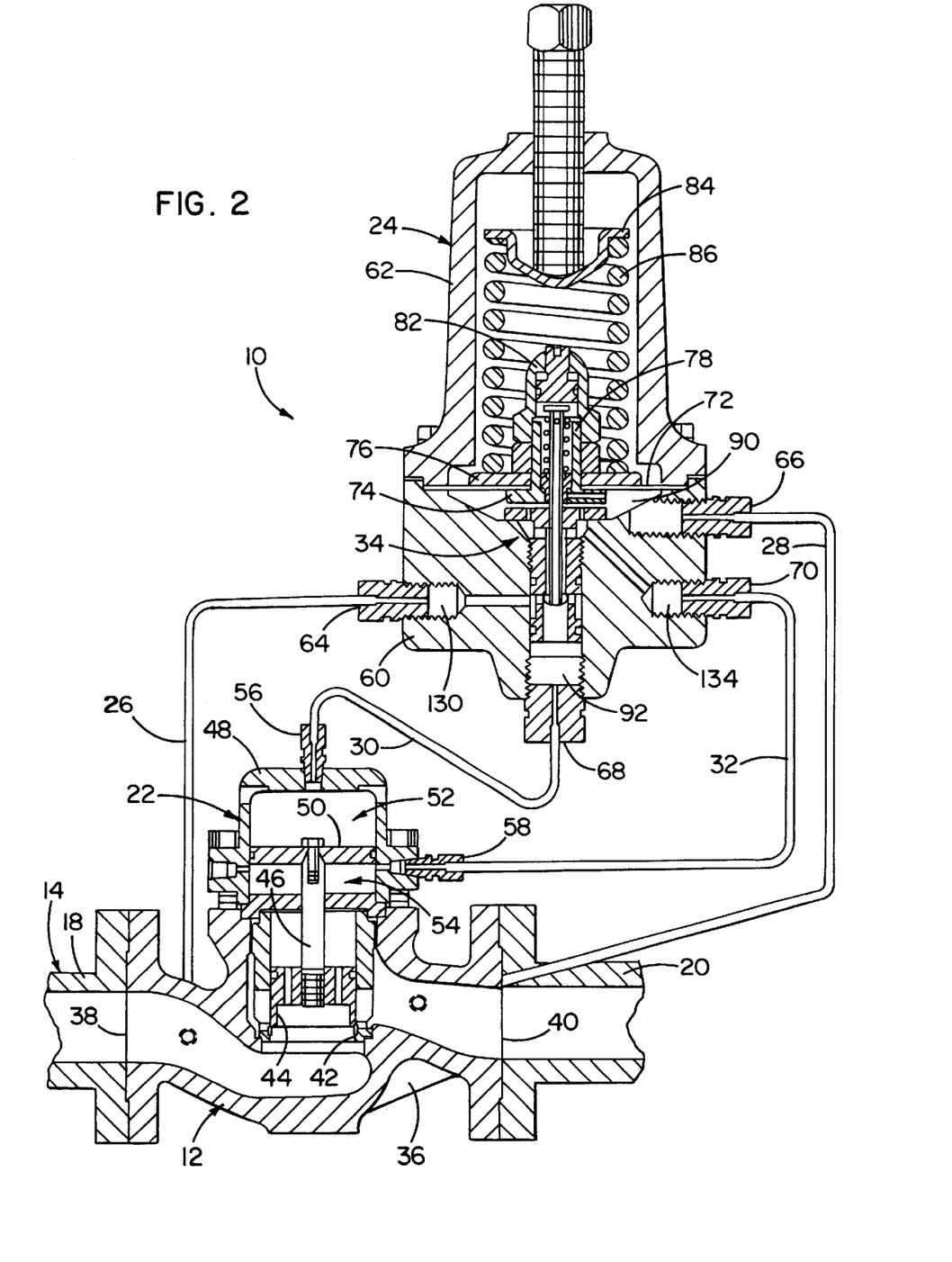
FIG. 2 is a partially schematic cross-sectional view of a pilot in accordance with the teachings of the present invention connected to a control valve, the pilot being in the lock-up position.
Figure 3:
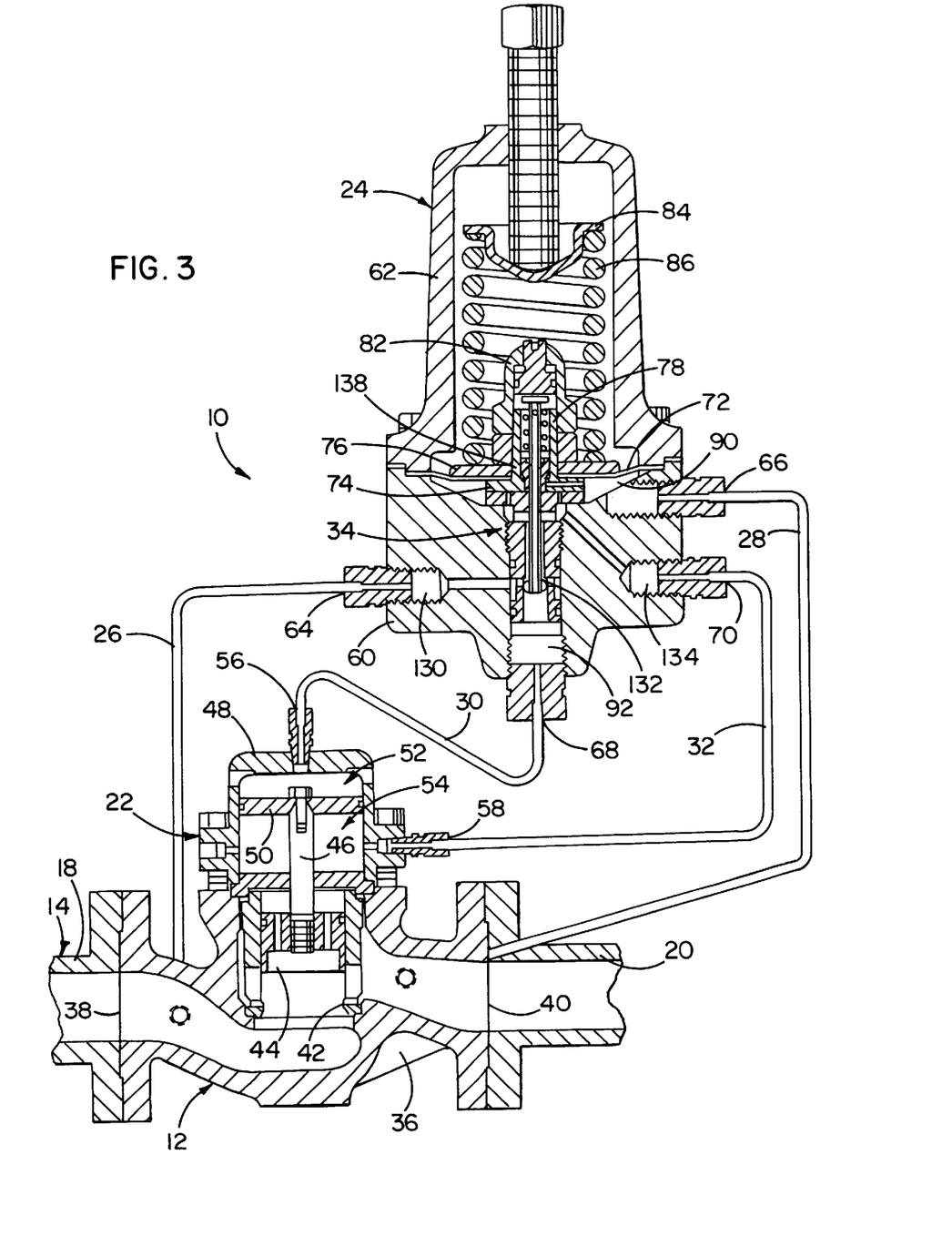
FIG. 3 is a partially schematic cross-sectional view of the pilot and control valve in the flowing position.

The control valve 12 is illustrated in greater detail in FIGS. 2 and 3. The control valve 12 includes a valve housing 36 defining an inlet 38 and an outlet 40. A seat 42 is provided between the inlet 38 and outlet 40 and is sized to receive a throttling element such as a plug 44. A stem 46 is connected to the plug 44 and extends outside the valve housing 36. In the illustrated embodiment, the plug 44, in a closed position, engages the seat 42 to cut off fluid flow through the control valve 12 (FIG. 3). In an open position, the plug 44 is spaced from the seat 42 to allow fluid flow therethrough (FIG. 3).

The actuator 22 is provided for moving the plug 44 between open and closed positions. As best shown in FIGS. 2 and 3, the actuator 22 includes a dome 48 with a pressure surface, such as piston head 50, sealingly engaging an interior surface of the dome 48. The piston head 50 is connected to the stem 46 and divides the dome 48 into an upper chamber 52 and a lower chamber 54. An upper chamber port 56 is provided for introducing a control pressure into the upper chamber 52, while a lower chamber port 58 is formed in the dome 48 for allowing control pressure into the lower chamber 52.

The actuator 22 moves the plug 44 between the opened and closed positions according to the pressures present in the upper and lower chambers 52, 54. When a greater pressure is present in the upper chamber 52 than in the lower chamber 54, the piston head 50 moves in a downward direction to drive the plug 44, via the stem 56, to the closed position (FIG. 2). On the other hand, when a greater pressure is present in the lower chamber 54 than in the upper chamber 52, the piston head 50 moves in an upward direction, driving the plug 44 toward the open position (FIG. 3).

While the actuator 22 of the illustrated embodiment is a piston-type actuator, it will be appreciated that other types of actuators may be used which are responsive to pressure differentials, such as diaphragm-type actuators which use a diaphragm, rather than a piston head, as the pressure surface. In addition, the illustrated embodiment shows the actuator 22 mounted directly to the control valve 12. Other arrangements, such as a separately mounted actuator and control valve, may be used without departing from the scope of the present invention.

The pilot valve 24 is provided for controlling the amount of pressure delivered to the upper and lower chambers 52, 54 of the actuator 22 in response to a measured parameter. As best shown in FIGS. 2 and 3, the pilot valve 24 includes a body 60 removably attached to a bonnet 62. The body 60 defines an inlet or first connection port 64, an outlet or second connection port 66, a first control pressure port 68, and a second control pressure port 70.

A diaphragm 72 is clamped in position between the body 60 and the bonnet 62, and a collar 74 and upper diaphragm plate 76 are attached thereto. The collar 74 includes an upwardly projecting threaded portion 78 over which the upper diaphragm plate 76 is received. A nut 82 is threaded over the upwardly projecting collar portion 78 to secure the collar 74, upper diaphragm plate 76, and spring follower 80 in place. A spring follower 84 is positioned near an upper portion of the bonnet 62, and a resilient member, such as control spring 86, is positioned between the upper diaphragm plate 76 and the spring follower 84. The control spring 86 provides a bias force which drives the diaphragm 72 in a downward direction.

The body 60 is formed with a center bore 88 which extends from an outlet chamber 90 to a first control fluid chamber 92. A stationary insert 94 (FIG. 4) is positioned inside the center bore 88 and includes a stationary collar portion 96, an intermediate shoulder portion 98, and a lower guide portion 100. A bore 102 extends through the insert 94 and has a small diameter at the stationary collar portion 96, an intermediate diameter at the shoulder portion 98, and a large diameter at the guide portion 100. A shoulder 104 is formed where the insert bore 102 transitions from the intermediate diameter to the large diameter. An upper transverse aperture 106 is formed in the insert 94 between the collar portion 96 and the shoulder portion 98.

Figure 4:
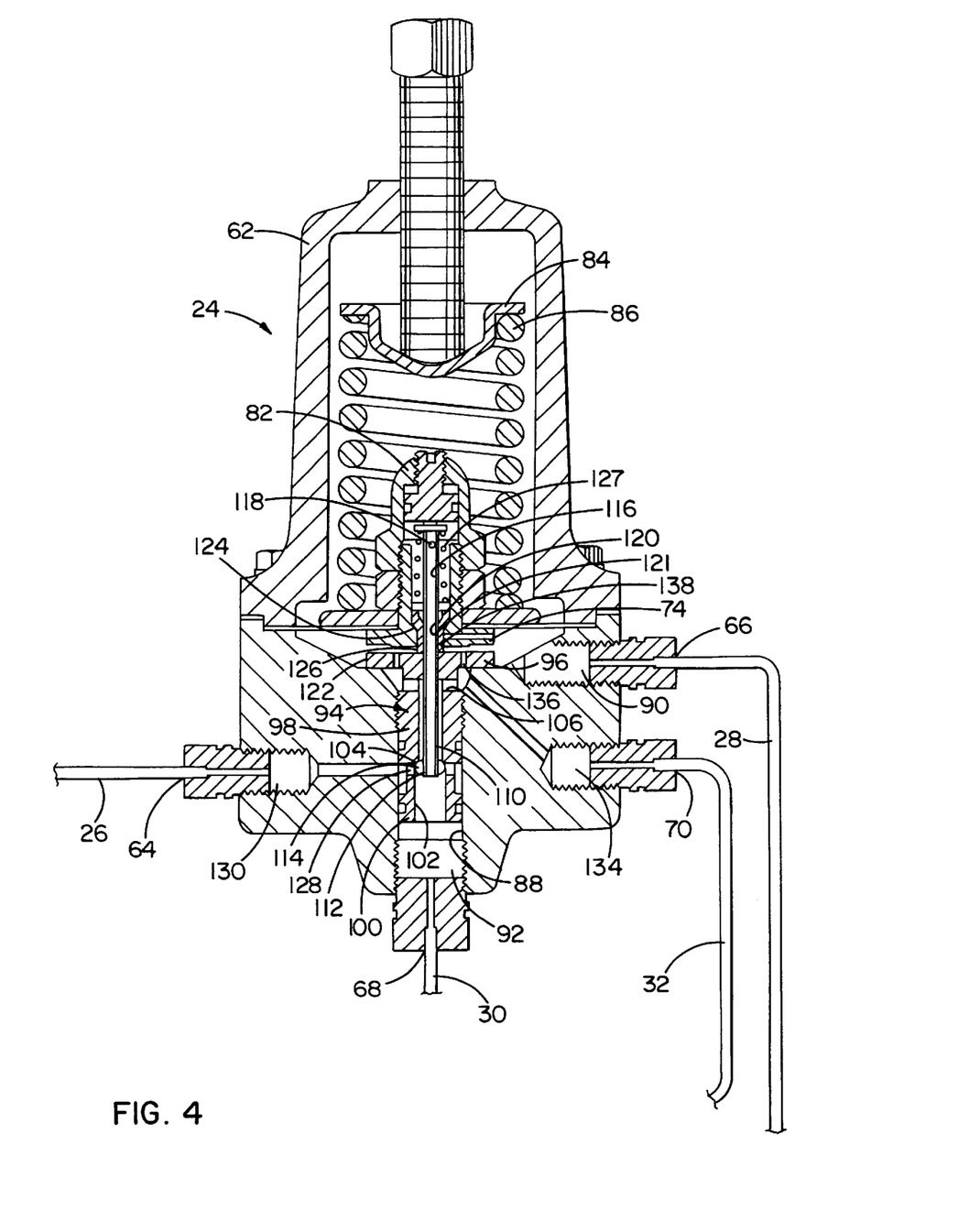
FIG. 4 is an enlarged detail of a pressure responsive valve incorporated in the pilot.

As best illustrated in FIG. 4, a valve member 110 is disposed for sliding movement inside the insert bore 102. The valve member 110 has an enlarged seat portion 112 sized to sealingly engage the large diameter portion of the insert bore 102. The seat portion 112 includes an upper tapered surface 114 for engaging the shoulder 104 of the insert 94. An upper end of the valve member 110 engages the nut 82 which is secured for movement with the diaphragm 72. A central passage 116 extends through the valve member 110, and a transverse port 118 is formed near the upper end of the valve member 110.

A stop collet 120 has an inner bore 121 sized to receive the valve member 110 and has a lower end positioned to engage a top surface 122 of the insert 94. The stop collet 120 includes a tapered surface 124 sized to engage an orifice 126 formed in the moveable collar 74. A return spring 127 is disposed between the stop member 120 and the nut 82 which biases the upper end of the insert 94 away from the stop collet 120.

A first inlet connection orifice 128 is formed in the insert 94 for establishing fluid communication between an inlet chamber 130 and the first control chamber 92 when the valve member 110 is in an upper position. A second inlet connection orifice 132 is formed by the annular space between the outside surface of the valve member 110 and the intermediate diameter of the insert bore 102. The second inlet connection orifice 132 establishes fluid communication between the inlet chamber 130 and a second control chamber 134 when the valve member 110 is in a lower position.

A first outlet connection orifice 136 is formed in the collar portion 96 of the insert 94 to establish fluid communication between the outlet chamber 90 and the second control chamber 134 when the collar 74 is in an upper position. A second outlet connection orifice 138 is defined by the space between the tapered surface 124 of the stop member 120 and the orifice 126 of the collar 74, to provide fluid communication between the outlet chamber 90 and the transverse port 118 of the valve member 110 when the collar 74 is in a lower position (which, in turn, establishes fluid communication via the central passage 116 with the first control chamber 92).

According to the illustrated embodiment, the first passageway 26 connects the inlet 64 of the pilot valve 24 to the upstream pipe section 18. The pilot valve outlet 66 is connected by the second passageway 28 to the downstream pipe section 20. The third passageway 30 connects the first pressure control port 68 to the actuator upper chamber 52, while the fourth passageway 32 connects the second pressure control port 70 to the actuator lower chamber 54.

In operation, it will be appreciated that the fluid in the upstream pipe section 18 has a first pressure while the fluid in the downstream pipe section 20 has a second pressure which is less than the first pressure due to a pressure drop through the control valve 12. The downstream fluid pressure is communicated via the second passageway 28 to the outlet chamber 90, where the pressure acts against the diaphragm 72 to counter act the biasing force of the control spring 86. The control spring 86 has a known compression force which corresponds to a pressure set point above which the bias force of the spring will be overcome. Accordingly, when the downstream fluid pressure is above the set point, the downstream fluid pressure pushes the diaphragm 72 in an upward direction toward a lock-up position, as shown in FIG. 2.

When the diaphragm 72 is in the lock-up position, the attached collar 74 is in the upper position, thereby exposing the first outlet connection orifice 136 so that the second control chamber 134 fluidly communicates with the outlet chamber 90. With the collar 74 in the upper position, the collar orifice 126 engages the tapered surface 124 of the stop member 120, thereby closing the second outlet connection orifice 138. The valve member 110 which is supported for movement with the diaphragm 72 also moves in an upward direction so that the tapered surface 114 of the enlarged portion 112 engages the insert shoulder 104 to close the second inlet connection orifice 132. The first inlet connection orifice 128, however, is open so that the inlet chamber 130 fluidly communicates with the first control chamber 92.

With the diaphragm 72 in the lock-up position, it is understood that upstream fluid at the first pressure flows through the first passageway 26 to the inlet chamber 130, through the first inlet connection orifice 128 to the first control chamber 92, and through the third passageway 30 to the actuator upper chamber 52, thereby to load the top surface of the piston head 50. The actuator lower chamber 54 communicates through the fourth passageway 32 to the second control chamber 134, through the first outlet connection orifice 136 to the outlet chamber 90, and through the second passageway 28 to the downstream pipe section 20. The actuator upper chamber 52 is therefore placed under the first pressure while the actuator lower chamber 54 is placed under the second, lower pressure to drive the piston head 50 in a downward direction, thereby closing the control valve 12.

When the downstream fluid pressure drops below the set point, the control spring 86 drives the diaphragm 72 in a downward direction toward a flowing position (FIG. 3). The collar 74 moves with the diaphragm 72 to the lower position so that the first outlet connection orifice 136 is closed and the second outlet connection orifice 138 is open. The valve member 110 also moves in a downward direction with the diaphragm 72 thereby to close off the first inlet connection orifice 128 while opening the second inlet connection orifice 132.

With the diaphragm 72 in the flowing position, therefore, fluid from the upstream pipe section 18 at the first pressure is directed through the first passageway 26 to the inlet chamber 130, through the second inlet connection orifice 132 to the outlet chamber 90, and through the fourth passageway 32 to the actuator lower chamber 54. Fluid in the actuator upper chamber 52 is directed through the third passageway 30 to the first control chamber 92, through the central passage 116 of the valve member 110 to the transverse port 118, through the second outlet connection orifice 138 to the outlet chamber 90, and through the second passageway 28 to the downstream pipe section 20. Upstream fluid at the first pressure therefore registers in the actuator lower chamber 54 while downstream fluid at the second pressure registers in the actuator upper chamber 52, creating a pressure differential which drives the piston head 50 in an upward direction to open the plug 44.

While the illustrated embodiment has a control valve 12 that closes when the plug 44 is in a lower position, control valves having different plug/seat orientations may be used in accordance with the present invention. For example, the pilot valve 24 may be used with a control valve where the plug is driven upward into the seat to close and downward away from the seat to open. The pilot valve 24 may be adapted for such a valve simply by connecting the first control chamber 92 to the actuator lower chamber 54 and the second control chamber 134 to the actuator upper chamber 52.

From the foregoing, it will be appreciated that a new and improved control valve assembly is provided. The control valve assembly includes a pilot valve which selectively connects upstream fluid at a first pressure to the upper and lower chambers of an actuator, while connecting downstream fluid at a second, lower pressure to the opposing actuator chamber. The pilot valve does not produce a continuous bleed of process fluid during operation, thereby eliminating process fluid waste. In addition, the pilot valve simultaneously switches the connections for the upper and lower actuator chambers, thereby reducing the respond time required by the pilot valve to adjust for changes in the measured parameter.

Although certain apparatus constructed in accordance with the teachings of the invention have been described herein, the scope of coverage of this patent is not limited thereto. On the contrary, this patent covers all embodiments of the teachings of the invention fairly following within the scope of the appended claims either literally or under the doctrine of equivalents.

What is claimed is:

1. A pilot valve for a control valve in a main flow line, comprising:

an inlet fluid chamber in fluid communication with fluid to be controlled in the main flow line on one side of the control valve;

an outlet fluid chamber in fluid communication with the main flow line on an opposite side of the control valve;

a first control fluid chamber in fluid communication with one side of a pressure surface in the control valve;

a second control fluid chamber in fluid communication with an opposite side of a pressure surface in the control valve;

a diaphragm disposed inside the outlet fluid chamber and movable in response to an outlet fluid pressure between a lockup position and a flow position;

a passage formed in the pilot valve establishes fluid communication between the inlet fluid chamber and the first control fluid chamber;

an insert defining a valve seat positioned between the inlet fluid chamber and the second control fluid chamber;

a slidable valve body supported for movement with the diaphragm, the valve body having a central passage with a lower end in fluid communication with the first control fluid chamber and an enlarged valve portion, wherein the passage is unobstructed and the enlarged valve portion engages the insert valve seat when the diaphragm is in the lockup position, and the enlarged valve portion is spaced from the insert valve seat and the passage is blocked when the diaphragm is in the flow position;

a stationary collar defining an orifice establishing fluid communication between the outlet fluid chamber and the second control fluid chamber;

a stationary stop member defining a valve seat positioned between the outlet fluid chamber and an upper end of the central passage; and a movable collar supported for movement with the diaphragm and defining an orifice, the movable collar engaging the stationary stop member valve seat to cut off flow through the movable collar orifice when the diaphragm is in the lockup position, and the movable collar engages the stationary collar to cut off flow through the stationary collar orifice when the diaphragm is in the flow position.

2. A control valve assembly for a main line transporting a fluid, the control valve assembly comprising:

a control valve;

an actuator adapted to actuate the control valve, the actuator including a dome and a pressure surface disposed inside the dome to define first and second chambers of the dome, the pressure surface moving in response to a pressure differential between the first and second chambers;

a pilot valve having a first connection port, a second connection port, a first control port, a second control port, a diaphragm in fluid communication with the second connection port, and a pressure responsive valve having a valve body;

a first passageway communicating the fluid at a first pressure from the main flow line to the first connection port;

a second passageway communicating the fluid at a second pressure from the main flow line to the second connection port, the second pressure being different than the first pressure;

a third passageway extending between the first control port and the first chamber of the actuator; and a fourth passageway extending between the second control port and the second chamber of the actuator;

wherein the valve body is supported for movement with the diaphragm in response to fluctuations in the second fluid pressure between a first position, in which the first passageway fluidly communicates with the third passageway and the second passageway fluidly communicates with the fourth passageway, and a second position, in which the first passageway fluidly communicates with the fourth passageway, and the second passageway fluidly communicates with the third passageway; and wherein the pilot valve includes a stationary collar defining an orifice establishing fluid communication between the second connection port and the second control port, and a movable collar supported for movement with the diaphragm between an open position, in which the movable collar is spaced from the stationary collar, and a closed position, in which the movable collar engages the stationary collar to close off the stationary collar orifice.

3. The control valve assembly of claim 2, further comprising a spring engaging and biasing the diaphragm in a first direction.

4. The control valve assembly of claim 3, in which the spring includes a compression adjusting device.

5. The control valve assembly of claim 2, in which the pilot valve further comprises an orifice establishing fluid communication between the first connection port and the first control port, and in which the valve body is movable to selectively open and close the orifice.

6. The control valve assembly of claim 2, in which the pilot valve further includes an insert defining a valve seat positioned between the first connection port and the second control port, and in which the valve body includes an enlarged valve portion sized to engage the valve seat, the valve body being movable to selectively open and close the valve seat.

7. The control valve assembly of claim 2, in which the pressure surface comprises a piston head.

8. A control valve assembly for a main line transporting a fluid, the control valve assembly comprising:

a control valve;

an actuator adapted to actuate the control valve, the actuator including a dome and a pressure surface disposed inside the dome to define first and second chambers of the dome, the pressure surface moving in response to a pressure differential between the first and second chambers;

a pilot valve having a first connection port, a second connection port, a first control port, a second control port, a diaphragm in fluid communication with the second connection port, and a pressure responsive valve having a valve body;

a first passageway communicating the fluid at a first pressure from the main flow line to the first connection port;

a second passageway communicating the fluid at a second pressure from the main flow line to the second connection port, the second pressure being different than the first pressure;

a third passageway extending between the first control port and the first chamber of the actuator; and a fourth passageway extending between the second control port and the second chamber of the actuator;

wherein the valve body is supported for movement with the diaphragm in response to fluctuations in the second fluid pressure between a first position, in which the first passageway fluidly communicates with the third passageway and the second passageway fluidly communicates with the fourth passageway, and a second position, in which the first passageway fluidly communicates with the fourth passageway, and the second passageway fluidly communicates with the third passageway; and wherein the valve body includes a central passage having a first end in fluid communication with the first control port and a second end, and in which the pilot valve further comprises a stationary stop member defining a valve seat positioned between the second connection port and the second end of the central passage, and a movable collar supported for movement with the diaphragm and having a center orifice sized to engage the valve seat, the movable collar moving between an open position, in which the center orifice is spaced from the valve seat, and a closed position in which the center orifice engages the valve seat.

9. The control valve assembly of claim 8, further comprising a spring engaging and biasing the diaphragm in a first direction.

10. The control valve assembly of claim 9, in which the spring includes a compression adjusting device.

11. The control valve assembly of claim 8, in which the pilot valve further comprises an orifice establishing fluid communication between the first connection port and the first control port, and in which the valve body is movable to selectively open and close the orifice.

12. The control valve assembly of claim 8, in which the pilot valve further includes an insert defining a valve seat positioned between the first connection port and the second control port, and in which the valve body includes an enlarged valve portion sized to engage the valve seat, the valve body being movable to selectively open and close the valve seat.

13. The control valve assembly of claim 8, in which the pressure surface comprises a piston head.

14. A control valve assembly for use in a main flow line transporting fluid, the control valve assembly comprising:

a control valve adapted to be disposed in the main flow line;

an actuator having a dome, a pressure surface disposed inside the dome for actuating the control valve between open and closed positions, the pressure surface dividing the dome into first and second chambers;

a pilot valve having an inlet in fluid communication with an upstream portion of the main flow line, an outlet in fluid communication with a downstream portion of the main flow line, a first control pressure port in fluid communication with the actuator first chamber, a second control pressure port in fluid communication with the actuator second chamber, a diaphragm biased in a first direction, the diaphragm fluidly communicating with the pilot valve outlet so that downstream fluid pressure acts against the diaphragm in a second, opposite direction, and a pressure responsive valve having a valve body supported for movement with the diaphragm, the valve body movable between a first position, in which the inlet fluidly communicates with the first control pressure port and the outlet fluidly communicates with the second pressure control port, and a second position, in which the inlet fluidly communicates with the second pressure control port, and the outlet fluidly communicates with the first pressure control port;

wherein the pilot valve also includes a stationary collar defining an orifice establishing fluid communication between the outlet and the second control pressure port, and a movable collar supported for movement with the diaphragm between an open position, in which the movable collar is spaced from the stationary collar, and a closed position, in which the movable collar engages the stationary collar to close off the stationary collar orifice.

15. The control valve assembly of claim 14, in which the pilot valve further includes means for adjusting a magnitude of the diaphragm bias.

16. The control valve assembly of claim 14, in which the pilot valve further comprises an orifice establishing fluid communication between the inlet and the first control pressure port, and in which the valve body is movable to selectively open and close the orifice.

17. The control valve assembly of claim 14, in which the pilot valve further includes an insert defining a valve seat positioned between the inlet and the second control pressure port, and in which the valve body includes an enlarged valve portion sized to engage the valve seat, the valve body being movable to selectively open and close the valve seat.

18. The control valve assembly of claim 14, in which the pressure surface comprises a piston head.

19. A control valve assembly for use in a main flow line transporting fluid, the control valve assembly comprising:

a control valve adapted to be disposed in the main flow line;

an actuator having a dome, a pressure surface disposed inside the dome for actuating the control valve between open and closed positions, the pressure surface dividing the dome into first and second chambers;

a pilot valve having an inlet in fluid communication with an upstream portion of the main flow line, an outlet in fluid communication with a downstream portion of the main flow line, a first control pressure port in fluid communication with the actuator first chamber, a second control pressure port in fluid communication with the actuator second chamber, a diaphragm biased in a first direction, the diaphragm fluidly communicating with the pilot valve outlet so that downstream fluid pressure acts against the diaphragm in a second, opposite direction, and a pressure responsive valve having a valve body supported for movement with the diaphragm, the valve body movable between a first position, in which the inlet fluidly communicates with the first control pressure port and the outlet fluidly communicates with the second pressure control port, and a second position, in which the inlet fluidly communicates with the second pressure control port, and the outlet fluidly communicates with the first pressure control port;

wherein the valve body includes a central passage having a first end in fluid communication with the first control pressure port and a second end, and in which the pilot valve further comprises a stationary stop member defining a valve seat positioned between the outlet and the second end of the central passage, and a movable collar supported for movement with the diaphragm and having a center orifice sized to engage the valve seat, the movable collar moving between an open position, in which the center orifice is spaced from the valve seat, and a closed position in which the center orifice engages the valve seat.

20. The control valve assembly of claim 19, in which the pilot valve further includes means for adjusting a magnitude of the diaphragm bias.

21. The control valve assembly of claim 19, in which the pilot valve further comprises an orifice establishing fluid communication between the inlet and the first control pressure port, and in which the valve body is movable to selectively open and close the orifice.

22. The control valve assembly of claim 19, in which the pilot valve further includes an insert defining a valve seat positioned between the inlet and the second control pressure port, and in which the valve body includes an enlarged valve portion sized to engage the valve seat, the valve body being movable to selectively open and close the valve seat.

23. The control valve assembly of claim 19, in which the pressure surface comprises a piston head.

\* \* \* \* \*